US009660261B2

United States Patent
Yamamoto et al.

(10) Patent No.: US 9,660,261 B2
(45) Date of Patent: *May 23, 2017

(54) POSITIVE ELECTRODE ACTIVE MATERIAL, METHOD FOR PRODUCING THE SAME, AND ELECTROCHEMICAL DEVICE

(71) Applicant: Sony Corporation, Tokyo (JP)

(72) Inventors: Kenta Yamamoto, Kanagawa (JP); Yuri Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,016

(22) Filed: Jul. 1, 2016

(65) Prior Publication Data

US 2016/0315319 A1    Oct. 27, 2016

Related U.S. Application Data

(63) Continuation of application No. 12/733,363, filed as application No. PCT/JP2008/065711 on Sep. 2, 2008, now Pat. No. 9,413,005.

(30) Foreign Application Priority Data

Sep. 7, 2007 (JP) ................................ 2007-233135

(51) Int. Cl.
*H01M 4/50* (2010.01)
*H01M 10/054* (2010.01)
(Continued)

(52) U.S. Cl.
CPC ............ *H01M 4/502* (2013.01); *C01G 45/02* (2013.01); *H01M 4/505* (2013.01); *H01M 4/623* (2013.01);
(Continued)

(58) Field of Classification Search
CPC ..................................................... C01G 45/02
See application file for complete search history.

(56) References Cited

U.S. PATENT DOCUMENTS 6,713,213 B2    3/2004 Ito et al.
8,415,558 B2    4/2013 Yoneya et al.
(Continued)

FOREIGN PATENT DOCUMENTS

JP    52-128521 A    10/1977
JP    63-148550       6/1988
(Continued)

OTHER PUBLICATIONS

Aurbach, D. et al., "Prototype systems for rechargeable magnesium batteries", Letters to Nature, Oct. 12, 2000, pp. 724-727, vol. 407, Macmillan Magazines Ltd, Israel.

(Continued)

*Primary Examiner* — Ula C Ruddock
*Assistant Examiner* — Amanda Barrow
(74) *Attorney, Agent, or Firm* — Wolf, Greenfield & Sacks, P.C.

(57) ABSTRACT

The invention provides a high-capacity positive electrode active material capable of sufficiently exploiting the excellent characteristics of magnesium metal or the like as a negative electrode active material, such as high energy capacity; a method for producing the same; and an electrochemical device using the positive electrode active material. A positive electrode 11 includes a positive electrode can 1, a positive pole pellet 2 having a positive electrode active material and the like, and a metal mesh support 3. A negative electrode 12 includes a negative electrode cap 4 and a negative electrode active material 5 such as magnesium metal. The positive electrode pellet 2 and the negative electrode active material 5 are disposed so as to sandwich a (Continued)

separator 6, and an electrolyte 7 is injected into the separator 6. The positive electrode active material, which provides the feature of the invention, is synthesized by a step of reacting a permanganate, such as potassium permanganate, with hydrochloric acid preferably having a concentration of 3 to 4 mol/l to produce a precipitate, and a step of filtering the precipitate, thoroughly washing the filtered precipitate with water, and then subjecting the washed precipitate to heat treatment preferably at a temperature of 300 to 400° C. for not less than 2 hours, thereby giving a manganese oxide.

17 Claims, 4 Drawing Sheets

(51) Int. Cl.
   *H01M 4/62*   (2006.01)
   *C01G 45/02*  (2006.01)
   *H01M 4/505*  (2010.01)
   *H01M 4/38*   (2006.01)
   *H01M 4/02*   (2006.01)

(52) U.S. Cl.
   CPC ......... *H01M 4/625* (2013.01); *H01M 10/054* (2013.01); *C01P 2002/72* (2013.01); *H01M 4/38* (2013.01); *H01M 2004/028* (2013.01); *Y02E 60/122* (2013.01); *Y02P 70/54* (2015.11)

(56) References Cited

U.S. PATENT DOCUMENTS

| | | |
|---|---|---|
| 8,691,434 B2 | 4/2014 | Yamamoto et al. |
| 8,993,178 B2 | 3/2015 | Nakayama et al. |
| 9,413,005 B2 | 8/2016 | Yamamoto et al. |
| 2002/0106560 A1 | 8/2002 | Kolb et al. |
| 2002/0114993 A1 | 8/2002 | Miyaki et al. |
| 2003/0059684 A1 | 3/2003 | Takami et al. |
| 2004/0101754 A1 | 5/2004 | Yamamoto |
| 2004/0197655 A1 | 10/2004 | Randell |
| 2005/0135993 A1 | 6/2005 | Xu et al. |
| 2005/0233215 A1 | 10/2005 | Yamaguchi et al. |
| 2006/0085971 A1 | 4/2006 | Andrews et al. |
| 2006/0275664 A1 | 12/2006 | Ohzuku et al. |
| 2007/0082267 A1 | 4/2007 | Goodenough et al. |
| 2007/0111095 A1 | 5/2007 | Padhi et al. |
| 2007/0172737 A1 | 7/2007 | Nakayama et al. |
| 2009/0068568 A1 | 3/2009 | Yamamoto et al. |
| 2009/0217979 A1 | 9/2009 | Yoneya et al. |
| 2010/0136438 A1 | 6/2010 | Nakayama et al. |
| 2010/0196762 A1 | 8/2010 | Yamamoto et al. |
| 2011/0171536 A1 | 7/2011 | Oki et al. |
| 2011/0277832 A1 | 11/2011 | Shimizu et al. |

FOREIGN PATENT DOCUMENTS

| | | |
|---|---|---|
| JP | 63-187569 | 8/1988 |
| JP | 07-144918 A | 6/1995 |
| JP | 2003-086179 A | 3/2003 |
| JP | 2003-512704 A | 4/2003 |

OTHER PUBLICATIONS

Gregory et al., Nonaqueous Electrochemistry of Magnesium: Applications to Energy Storage, J. Electrochem Soc 1990, vol. 137, Issue 3, pp. 775-780.

Kobayashi et al, Xanes and EZAFS analysis of nano-size manganese dioxide as a cathode material for lithium-ion batteries, J. Materials Chemistry, www,rsc.org/materials, first published on the web May 13, 2004.

No Author Listed, Encyclopedia Britannica Online Academic Edition, X-ray diffraction, accessed Aug. 30, 2013, http://www.britannica.com/EBchecked/topic/650434/X-ray-diffraction.

Palos et al., Electrochemical lithium intercalation in disordered manganese oxides, Solid State Ionics, vol. 138, Issues 3-4, Jan. 1, 2001, pp. 203-212.

Venable F.P., The Reaction Between Hydrochloric Acid and Potassium Permanganate, J. American Chemical Society, 1920, 42 (2), pp. 237-239, published Feb. 1920.

Xu et al., Nanoporous amorphous manganese oxide as electrocatalyst for oxygen reduction in alkaline solutions, Electrochemistry Communications, 5, 2003, pp. 306-311.

POSITIVE ELECTRODE ACTIVE MATERIAL, METHOD FOR PRODUCING THE SAME, AND ELECTROCHEMICAL DEVICE

CROSS REFERENCE TO RELATED APPLICATIONS

The present application claims the benefit under 35 U.S.C. §120 as a continuation application of U.S. patent application Ser. No. 12/733,363, filed on Feb. 25, 2010, which is a national stage filing under 35 U.S.C. §371 of international PCT Application No. PCT/JP2008/065711, filed Sep. 2, 2008, which claims priority under 35 U.S.C. §119 to Japanese Patent Application JP 2007-233135, filed Sep. 7, 2007, the entire contents of each of which is incorporated herein by reference.

FIELD OF THE INVENTION

The invention relates to a positive electrode active material suitable for magnesium batteries and the like, a method for producing the same, and an electrochemical device using the positive electrode active material.

BACKGROUND OF THE INVENTION

Metals having a tendency to lose one or more electrons to form cations, i.e., metals with high ionization tendency, are mentioned as metals suitable as negative electrode active materials, one of the fundamental components of a battery. One example thereof is lithium metal. Batteries having lithium metal as the negative electrode active material are, in combination with various positive electrode active materials, such as oxides and sulfides, configured as nonaqueous electrolyte batteries. They have been commercialized and used mainly as power supply for small portable electronic devices.

In recent years, in order to provide small portable electronic devices with improved convenience, attempts have been successfully made to reduce the size, weight, and thickness thereof, while improving the performance. With such advances, batteries used as power supply for these devices are required to be smaller, lighter, and thinner, and also, in particular, to have a higher capacity. Therefore, with respect to the capacity per unit mass (mAh/g) or the capacity per unit volume (mAh/cm$^3$) of a negative electrode active material and a positive electrode active material forming a battery, it can be said that the higher the capacity, the better.

The energy capacity per unit mass of lithium metal (Li) is larger than that of other metals, and it thus is superior to the others. Accordingly, a number of researches have been reported on lithium secondary batteries. However, lithium secondary batteries have safety problems. Further, lithium is limited in resources and is expensive.

In comparison, magnesium is rich in resources and is much less expensive as compared with lithium. Further, magnesium metal has a high energy capacity per unit volume, and also has a higher energy density than lithium metal. Moreover, when used in a battery, high safety is expected. A magnesium battery is thus a battery capable of compensating for the disadvantages of a lithium secondary battery. Against this background, greater importance is being placed on the development of, as a next-generation, high-capacity battery, a nonaqueous electrolyte battery using magnesium metal as the negative electrode active material.

For examples, a magnesium secondary battery capable of 2000 or more charge/discharge cycles is reported in the below-mentioned D. Aurbach, Z. Lu, A. Schechter, Y. Gofer, H. Gizbar, R. Turgeman, Y. Cohen, M. Moshkovich, E. Levi, "Prototype systems for rechargeable magnesium batteries", Nature, 407, pp. 724-727 (2000) (pp. 724-726, FIG. 3) (hereinafter hereafter to as Nonpatent Document 1) and JP-T-2003-512704 (the term "JP-T" as used herein means a published Japanese translation of a PCT patent application) (pp. 12-19, FIG. 3). In such a battery, magnesium metal is used as the negative electrode active material, and a Chevrel compound $Cu_xMg_yMo_6S_8$ (x is 0 to 1, and y is 0 to 2) is used as the positive electrode active material. As the electrolyte, an electrolyte represented by a general formula $Mg(ZX_1R^1{}_mR^2{}_n)_2$ (Z is boron (B) or aluminum (Al), X is chlorine (Cl) or bromine (Br), $R^1$ and $R^2$ are hydrocarbon groups, and 1+m+n=4) dissolved in an aprotic solvent tetrahydrofuran (THF) or the like is used.

The Chevrel compound is a host-guest compound having $Mo_6S_8$ as the host and $Cu^{2+}$ and $Mg^{2+}$ as the guest. As shown in FIG. 7, $Mo_6S_8$ exists in the form of a cluster, in which six Mo atoms in the shape of a regular octahedron are surrounded by eight S atoms in the form of a regular hexahedron. A number of such clusters are regularly piled up to form the basic crystal structure. $Cu^{2+}$ and $Mg^{2+}$ occupy a position the channel region between two clusters, and are weakly bonded to $Mo_6S_8$.

Therefore, $Mg^{2+}$ can move in the Chevrel compound relatively easily. At the time of discharge, $Mg^{2+}$ is immediately stored in the Chevrel compound, while at the time of charge, the stored $Mg^{2+}$ is immediately released. The amount of metal ions stored in the Chevrel compound can be varied over a wide range by the rearrangement of electric charges on Mo and S. Results of X-ray analysis have revealed that between two $Mo_6S_8$ clusters, there are six sites A and six sites B capable of storing $Mg^{2+}$. However, $Mg^{2+}$ cannot occupy all of the twelve sites simultaneously.

Meanwhile, compounds generally called manganese dioxides encompass a wide variety of oxides with an apparent manganese valence of three to four, as well as those containing, in addition to manganese and oxygen, various cations and neutral molecules, such as water, in their structure. Various compounds with an extremely wide variety of compositions and structures are known. Such manganese dioxides have a manganese redox couple with relatively high electric potential, and thus are capable of forming batteries with high electromotive force. In addition, manganese is rich in resources, inexpensive, and highly safe. For these reasons, manganese dioxides have been studied and developed as positive electrode materials for aqueous solution batteries such as dry cells and also for nonaqueous solvent batteries such as lithium secondary batteries.

As manganese dioxides, various compounds are known having, as constitutional units, octahedrons in which six oxygens are coordinated around manganese. Such octahedrons are linked one another sharing faces, edges, and vertices, providing the octahedral chain structure of the compound. Examples thereof include a compound with a tunnel structure having a quadrangular section whose side has a length of one octahedron (1×1) and a compound with a tunnel structure having a quadrangular section whose side has a length of two octahedrons linked (2×2). Such a tunnel can be used as a channel (pathway) for ion diffusion. Therefore, compounds with a tunnel structure are potential positive electrode active materials, and the use thereof as electrode materials for lithium secondary batteries and the like has been proposed.

In this case, β-manganese dioxide (tetragonal system) has a tunnel dimension of (1×1), and γ/β-manganese dioxide (orthorhombic/tetragonal system) has tunnel dimensions of (1×1) and (1×1), which are both relatively small; in contrast, the tunnel dimension of an α-manganese dioxide (monoclinic system) is as relatively large as (2×2). When the tunnel dimension is small, this raises the concern that the crystal structure might be collapsed due to the repetition of storage/release of ions. Therefore, α-manganese dioxide with a large tunnel dimension, for example, is expected to be useful as a positive electrode active material (see the below-mentioned JP-A-7-144918 (claim 1, pp. 2 and 3, and FIG. 1) and JP-A-2003-86179 (claim 2, pp. 2-5, and FIGS. 1 and 3).

JP-A-7-144918 (claim 1, pp. 2 and 3, and FIG. 1) proposes a method for producing a manganese dioxide, according to which an inorganic salt of manganese (II), such as manganese nitrate (II), and a permanganate, such as lithium permanganate, are reacted in a solution acidized by the addition of an inorganic acid, such as sulfuric acid, thereby giving α-manganese dioxide $H_xMn_8O_{16}$ having hydrogen ions and manganese ions as main cations.

Further, JP-A-2003-86179 (claim 2, pp. 2-5, FIGS. 1 and 3) proposes a method for producing a manganese dioxide, according to which a sodium compound, such as sodium carbonate, and a manganese compound, such as β-manganese dioxide (mineral name: pyrolusite), are mixed at a molar ratio of Na:Mn=1:5, for example, and the mixture is subjected to heat treatment in an atmosphere with an oxygen partial pressure of 4 atm for 10 hours to reach 600° C., thereby giving α-manganese dioxide represented by a compositional formula $Na_{0.20}MnO_2$ by a dry process without the use of water.

Under the present circumstances, the energy capacity of the magnesium secondary battery reported in Nonpatent Document 1 and JP-T-2003-512704 (pp. 12-19, FIG. 3) is one half that of a lithium ion battery or even lower. As compared with existing batteries, it is difficult to increase the capacity of such a magnesium secondary battery. This is because of the low energy capacity per unit mass of molybdenum sulfide used as the positive electrode active material.

For example, at the time of discharge, provided that the Chevrel compound functions to the full extent and, starting from the state represented by a chemical formula $Mo_6S_8$, receives two $Mg^{2+}$ (formula weight: 24.3) to be brought into a state represented by a chemical formula $Mg_2Mo_6S_8$, the reception of two $Mg^{2+}$ with a total formula weight of 48.6 requires $Mo_6S_8$ in an amount equivalent to one chemical formula (formula weight: 832.2). That is, the energy capacity per unit mass of the Chevrel compound is only about 1/34 the energy capacity per unit mass of magnesium, and about 34 g of the Chevrel compound is required to extract the energy of 1 g of magnesium.

As can be understood from the above example, in order to take advantage of the characteristics of magnesium metal as a negative electrode active material having a high energy capacity per unit mass, it is necessary to develop a positive electrode active material having a high energy capacity per unit mass.

Meanwhile, manganese dioxides are expected to serve as positive electrode active materials for lithium secondary batteries and the like, but have the problem of low capacity. Further, like the method for producing a manganese dioxide reported in JP-A-2003-86179 (claim 2, pp. 2-5, FIGS. 1 and 3), a method that employs high-temperature, high-pressure synthesis conditions requires special production equipment, which possibly results in high cost.

The invention is aimed to solve the above problems. An object thereof is to provide a high-capacity positive electrode active material capable of sufficiently exploiting the excellent characteristics of magnesium metal or the like as a negative electrode active material, such as high energy capacity; a method for producing the same; and an electrochemical device using the positive electrode active material.

DISCLOSURE OF THE INVENTION

In order to solve the above problems, the present inventors closely examined the electrochemical characteristics of various positive electrode active materials and also methods for producing the same. As a result, they accomplished the invention.

Specifically, the invention relates to a positive electrode active material including a manganese oxide. The manganese oxide is obtained by filtering a precipitate resulting from the reaction of a permanganate with hydrochloric acid, and then subjecting the precipitate to heat treatment. The invention also relates to a method for producing a positive electrode active material, the method including a step of reacting a permanganate with hydrochloric acid to produce a precipitate, and a step of filtering the precipitate and then subjecting the same to heat treatment, thereby giving a manganese oxide as a positive electrode active material.

The invention also relates to an electrochemical device including a first pole, a second pole, and an electrolyte. The electrochemical device is characterized in that:

the second pole has an active material that is oxidized to form metal ions, the metal ions being magnesium ions, aluminum ions, or lithium ions;

the first pole has as an active material the positive electrode active material of the invention; and the electrochemical device is configured so that the metal ions are stored in the first pole.

When a manganese dioxide is synthesized using a permanganate as an oxidizing agent, generally, as shown in JP-A-7-144918 (claim 1, pp. 2 and 3, and FIG. 1), a manganese (II) salt, such as manganese nitrate (II), is reacted with a permanganate in a solution acidified by the addition of sulfuric acid. The reaction in this case is represented, for example, by the following reaction formula:

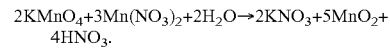

Meanwhile, as in the case of the positive electrode active material of the invention and the method for producing the same, when hydrochloric acid is added to a permanganate, the reaction is represented, for example, by the following reaction formula:

As is obvious from the comparison between the two reaction formulae, it is obvious that the way a manganese dioxide is produced is completely different between the two reactions. In the reaction in which hydrochloric acid is added to a permanganate, chloride ions are oxidized, resulting in the generation of harmful chlorine. Therefore, customarily, this reaction is not employed as a method for manganese dioxide synthesis. However, the present inventors discovered that a manganese oxide synthesized by this normally unused method exhibits a high discharge capacity as a positive electrode active material.

Like ordinary manganese dioxides, the above-mentioned manganese oxide is capable of forming, in combination with magnesium or a like negative electrode active materials, a battery of high electromotive force. In addition, manganese is rich in resources, inexpensive, and highly safe. The manganese oxide thus has excellent characteristics as a positive electrode active material for nonaqueous solvent batteries.

The electrochemical device of the invention includes a first pole, a second pole, and an electrolyte. The second pole has an active material that is oxidized to form metal ions, the metal ions being magnesium ions, aluminum ions, or lithium ions, while the first pole has as an active material the positive electrode active material of the invention. The electrochemical device is configured so that the metal ions are stored in the first pole.

In the second pole, oxidization reaction to produce the metal ions takes place. Because magnesium, aluminum, and lithium are metals with high ionization tendency, such reaction is accompanied by a large enthalpy change, and thus a high electromotive force can be generated. In addition, the formula weights per unit charge of the magnesium ions, the aluminum ions, and the lithium ions are small, i.e., 12.2, 9.0, and 6.9, respectively. Therefore, a large amount of electricity is generated per unit mass of the active material of the second pole. As a result, high energy capacity is obtainable per unit mass of the active material of the second pole.

The active material of the first pole here is the above-mentioned positive electrode active material of the invention having a high discharge capacity, and thus can sufficiently exploit the high energy capacity of the active material of the second pole. As a result, it is possible to configure, for example, a battery with high energy capacity per unit mass and unit volume, which also is inexpensive and highly safe.

BEST MODE OF CARRYING OUT THE INVENTION

Figure 1:
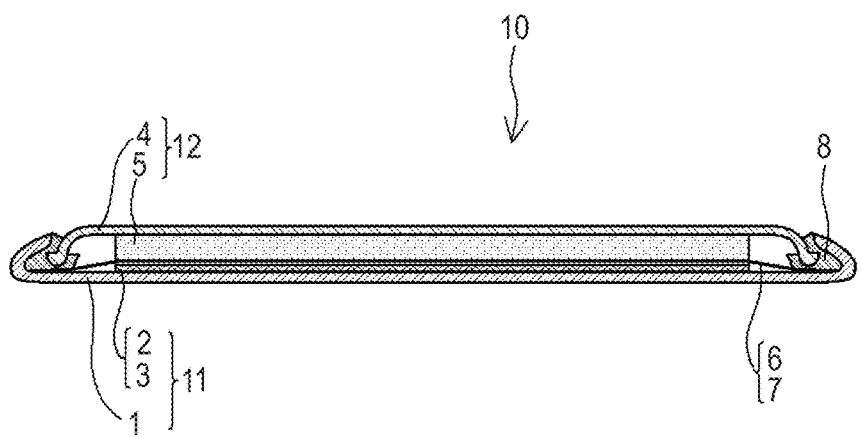
FIG. 1 is a sectional view showing the structure of a magnesium battery according to one embodiment of the invention.

In the positive electrode active material of the invention, it is preferable that the manganese oxide has, as only one clear diffraction peak, a broad diffraction peak that appears at a diffraction angle $2\theta$ of about 38° in a powder X-ray diffraction pattern. Such a powder X-ray diffraction pattern does not correspond to the powder X-ray diffraction pattern of a manganese dioxide of any of the conventionally known crystal systems. The diffraction peak that appears at a diffraction angle $2\theta$ of near 38° is a peak common to manganese dioxides. No other clear diffraction peak exists, and this is a characteristic of the powder X-ray diffraction pattern of the manganese oxide. This indicates that the structure of manganese oxide is poorly crystalline. Accordingly, the manganese oxide is likely to be an amorphous manganese oxide that does not belong to a specific crystal system. Supposedly, like ordinary manganese dioxides, the manganese oxide is nonstoichiometric, has manganese with an oxidation number of +3 and +4, and contains, in addition to manganese and oxygen, different kinds of cations and water in the amorphous structure thereof.

In the positive electrode active material of the invention and the method for producing the same, it is preferable that the precipitate after filtration is washed with water, and then subjected to the heat treatment, thereby giving the manganese oxide. The process of washing with water is employed to wash away ions that are used in the precipitation and remain on the resulting precipitate.

The permanganate is preferably at least one kind of permanganate selected from the group consisting of sodium permanganate ($NaMnO_4$), potassium permanganate ($KMnO_4$), and magnesium permanganate ($Mg(MnO_4)_2$).

The hydrochloric acid has preferably a concentration of 3 to 4 mol/l.

The heat treatment is preferably conducted at a temperature of 300 to 400° C. The heat treatment is preferably conducted for a period of not less than 2 hours. As mentioned above, due to the octahedral constitutional units having manganese and oxygen, etc., the manganese oxide has a space formed therein, such as a tunnel structure or a layered structure. The above-mentioned heat treatment is treatment for expelling water molecules contained in such a space, so that the space can be used as an ion diffusion channel (pathway). When the heat-treatment temperature is too low, or the heat-treatment time is too short, water molecules are not sufficiently expelled. As a result, the ion diffusion channel (pathway) is insufficiently formed, and the manganese oxide does not sufficiently exhibit its high performance as a positive electrode active material. In addition, when the heat-treatment temperature is too high, this will result in release of oxygen, change in the structure of the manganese oxide, etc., possibly reducing the capacity as a positive electrode active material.

In the electrochemical device of the invention, it is preferable that the active material of the second pole is magnesium, aluminum, or lithium as an elemental metal, or is an alloy containing these metals. When only the energy capacity is considered, it is desirable to use a pure metal in the negative electrode. However, an alloy is also applicable for the purpose of improving the battery performance in addition to the energy capacity, such as imparting the second pole with stability against repetitive charging and discharging.

Further, it is particularly preferable that the metal ions are magnesium ions. As mentioned above, the use of magnesium metal as a negative electrode active material is advantageous because of the high energy capacity per unit volume, and also in terms of safety and ease of handling. In addition, magnesium is rich in resources and is much less expensive as compared with lithium.

Further, the positive electrode active material is preferably retained in the first pole as a mixture with an electroconductive material and a high-polymer binder. The manganese oxide has a low electrical conductivity. Therefore, in order for the electrochemical reaction to proceed smoothly, it is preferable to add the electroconductive material to the positive electrode active material, and mix the two with the high-polymer binder, thereby integrating them into a positive electrode mixture. The electroconductive material is not limited, and is preferably a graphite powder and/or carbon particulates, for example. The high-polymer binder is not limited as long as it is capable of binding the positive electrode active material and the electroconductive material, and a preferred example thereof is polyvinylidene fluoride (PVdF).

The electrochemical device is preferably configured as a battery. Such a battery may be a primary battery that is discarded after a single use, but is preferably a rechargeable secondary battery. The secondary battery can be charged by applying an electrical current in the opposite direction to that of discharge, whereby the battery after use can be restored to its charged state. The battery can thus be used repeatedly, allowing an effective use of resources.

An embodiment of the invention is described in detail hereinafter with reference to the drawings. In this embodiment, explanations are given about an example of the positive electrode active material according to the invention and also about an example of the method for producing the same. Explanations are also given about a magnesium battery as an example of the electrochemical device according to the invention using the positive electrode active material. The explanations are given just by way of example, and the invention is not limited thereto.

FIG. 1 is a sectional view showing the structure of a magnesium battery 10 according to this embodiment of the invention. As shown in FIG. 1, the magnesium battery 10 is formed as a coin-cell battery having a thin, disk-like outer shape. A positive electrode 11 that serves as a first pole includes a positive electrode can 1, a positive electrode pellet 2, and a metal mesh support 3. A negative electrode 12 that serves as a second pole includes a negative electrode cap 4 and a negative electrode active material 5. The positive electrode pellet 2 and the negative electrode active material 5 are each in contact with a separator 6, and are disposed in such a manner that the separator 6 prevents a short circuit therebetween. The separator 6 has injected thereinto an electrolyte 7.

The positive electrode can 1 functions as a collector and an external positive terminal of the battery. The positive electrode pellet 2 is obtained by compression-molding a positive electrode mixture, which has a positive electrode material, an electric conductor, and a binder, into a disc-like shape together with the metal mesh support 3, and is disposed inside the positive electrode can 1. The metal mesh support 3 functions as a support of the positive electrode pellet and also as a collector.

The positive electrode active material is a positive electrode active material according to the invention. It includes a manganese oxide synthesized by, for example, mixing a permanganate, such as potassium permanganate, with hydrochloric acid having a concentration of about 3 to 4 mol/l; allowing the mixture to react under stirring at room temperature; then allowing to stand; filtering the resulting precipitate; thoroughly washing the filtered precipitate with water; and then subjecting the washed precipitate to heat treatment preferably at 300 to 400° C. for not less than 2 hours.

The negative electrode cap 4 functions as a collector and an external negative terminal of the battery. The negative electrode active material 5 is, for example, a magnesium-metal plate having a disk-like shape, and is disposed in contact with the negative electrode cap 4. In order to maximize the energy capacity of the negative electrode 12, it is desirable to use a pure elemental metal for the negative electrode active material 5. However, for the purpose of improving the battery performance in addition to the energy capacity, such as imparting the negative electrode active material 5 with stability against repetitive charging and discharging, the material for the negative electrode active material 5 may also be a magnesium alloy having aluminum or the like added to magnesium. Aluminum or lithium is also usable in place of magnesium.

As the separator 6, a polypropylene-, polyethylene-, or like polyolefine-based microporous film can be used, for example. The electrolyte 7 is an aprotic solvent solution of a suitable salt containing the above-mentioned metal ions, and is, for example, a tetrahydrofuran (THF) solution of magnesium dichlorobutylethyl aluminate $Mg[AlCl_2(C_2H_5)(C_4H_9)]_2$ described in Nonpatent Document 1 as an electrolyte for magnesium batteries. The positive electrode can 1 and the negative electrode cap 4 are fitted together via a sealing gasket 8. The sealing gasket 8 electrically insulates the positive electrode can 1 from the negative electrode cap 4, and at the same time functions to hermetically seal the inside of the magnesium battery 10.

At the time of discharge, in the negative electrode 12 of the magnesium battery 10, magnesium metal or an alloy thereof, which is the negative electrode active material 5, is oxidized to release electrons through the negative electrode cap 4 to an external circuit (loading) in accordance with the following reaction formula:

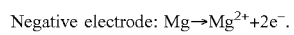

Negative electrode: $Mg \rightarrow Mg^{2+} + 2e^-$.

Magnesium ions resulting from the reaction are transferred to the electrolyte 7, diffuse into the electrolyte 7, and move to the positive electrode 11 side.

In the positive electrode 11, the magnesium ions are captured by the surface of the manganese oxide that is the positive electrode active material, or by the inner wall of pores thereof, and then react with the positive electrode active material. At this time, the manganese forming the positive electrode active material is reduced, and captures electrons through the positive electrode can 1 or the like from the external circuit (loading).

At the time of discharge of the magnesium battery 10, a direct current power source may be connected thereto as an external circuit to apply an electrical current from the external circuit to the magnesium battery 10 in the opposite direction to that of discharge. This causes an electrode reaction in such an opposite direction, whereby the magnesium battery 10 after use can be restored to its charged state. That is, the magnesium battery 10 is configured as a rechargeable secondary battery, and can thus be use repeatedly, allowing an effective use of resources.

EXAMPLES

Examples according to the invention are described hereinafter.

Example 1

In Example 1, a coin-cell magnesium battery 10 as explained in the embodiment with reference to FIG. 1 was produced. Magnesium metal was used as the negative electrode active material, and the manganese oxide according to the invention was used as the positive electrode active material. The performance of the manganese oxide of the invention as a positive electrode active material was examined.

<Formation of Positive Electrode Pellet 2 and Negative Electrode Active Material 5>

First, 2 g of potassium permanganates was added to 50 ml of hydrochloric acid having a concentration 4 mol/l. The mixture was stirred for 15 minutes at room temperature, and then allowed to stand. Subsequently, the resulting precipitate was washed thoroughly with water, and then subjected to heat treatment at 300° C. for 2 hours to give a manganese oxide.

Subsequently, the manganese oxide, graphite that serves as an electroconductive material, and polyvinylidene fluoride (PVdF) that serves as binder were mixed at a mass ratio of 78:20:2. To this mixture was added N-methylpyrrolidone (NMP) as a solvent to solve the binder polyvinylidene fluoride. The manganese oxide and graphite were dispersed in the resulting solution, thereby giving a positive electrode mixture slurry. The obtained slurry was subjected to heat treatment at a temperature of 120° C. for 2 hours to evaporate NMP from the slurry to cause solidification. The obtained solid was ground to powder in a mortar to give a positive electrode mixture.

A 0.1-g quantity of the positive electrode mixture was weighed, crimped to a metal mesh support 3 made of nickel under a predetermined pressure, and press-molded into a disc-like shape, thereby giving a positive electrode pellet 2 with a diameter of 15.5 mm and a thickness of a thickness of 250 μm.

Meanwhile, a magnesium plate was processed into a disk-like shape with a diameter of 15.5 mm and a thickness of 800 μm, thereby giving a negative electrode active material 5.

<Production of Magnesium Battery 10>

The magnesium battery 10 was assembled in an argon glove box. First, the positive electrode pellet 2 was disposed inside the positive electrode can 1. A separator 6 formed of a 25-μm-thick microporous polyethylene film was then disposed thereon, and a fixed amount of electrolyte 7 was injected into the separator 6. The electrolyte 7 herein was a THF solution (concentration: 0.25 mol/l) of magnesium dichlorobutylethyl aluminate Mg [AlCl$_2$(C$_2$H$_5$) (C$_4$H$_9$)]$_2$ described in Nonpatent Document 1 as an electrolyte for magnesium batteries. Subsequently, the magnesium plate that serves as the negative electrode active material 5 was placed on the separator 6. Further, a sealing gasket 8 and a negative electrode cap 4 were disposed at a predetermined position. Finally, the positive electrode can 1 and the negative electrode cap 4 were fitted together via the sealing gasket 8, thereby giving a coin-cell magnesium battery 10 with an outer diameter of 20 mm and a height of 1.6 mm.

<Discharge Test>

The thus-produced magnesium battery 10 of Example 1 was subjected to a discharge test at a constant current of 0.5 mA until the battery voltage reached 0.2 V. The obtained discharge capacity is shown in Table 1. The magnesium metal that serves as the negative electrode active material 5 is disposed in excess, and therefore, the discharge capacity determined herein can be regarded as depending on the discharge capacity of the positive electrode active material.

Comparative Examples 1 to 5

In Comparative Example 1, in place of the manganese oxide of the invention, trimolybdenum tetrasulfide (Mo$_6$S$_8$) described in Nonpatent Document 1 as a positive electrode active material for magnesium batteries was used as the positive electrode active material. Otherwise as in Example 1, a magnesium battery with the same structure as that of the magnesium battery 10 shown in FIG. 1 was produced.

In Comparative Example 2 to 5, in place of the manganese oxide of the invention, electrolyte γ/ε-manganese dioxide (orthorhombic/hexagonal system), heat-treated β-manganese dioxide (tetragonal system), dimanganese trioxide (Mn$_2$O$_3$), and trimanganese tetraoxide (Mn$_3$O$_4$), which are readily accessible manganese oxides, were used as the positive electrode active materials, respectively. Otherwise as in Example 1, magnesium batteries with the same structure as that of the magnesium battery 10 shown in FIG. 1 were produced.

The magnesium batteries of Comparative Example 1 to 5 were subjected to the same discharge test as in Example 1. The obtained discharge capacity is shown in Table 1.

TABLE 1

| Battery | Positive electrode active material | Discharge capacity (mAh/g) |
|---|---|---|
| Example 1 | Manganese oxide according to the invention | 314.0 |
| Comparative Example 1 | Mo$_6$S$_8$ | 75.2 |
| Comparative Example 2 | γ/ε-MnO$_2$ | 23.3 |
| Comparative Example 3 | β-MnO$_2$ | 48.8 |
| Comparative Example 4 | Mn$_2$O$_3$ | 5.5 |
| Comparative Example 5 | Mn$_3$O$_4$ | 6.7 |

Figure 2:
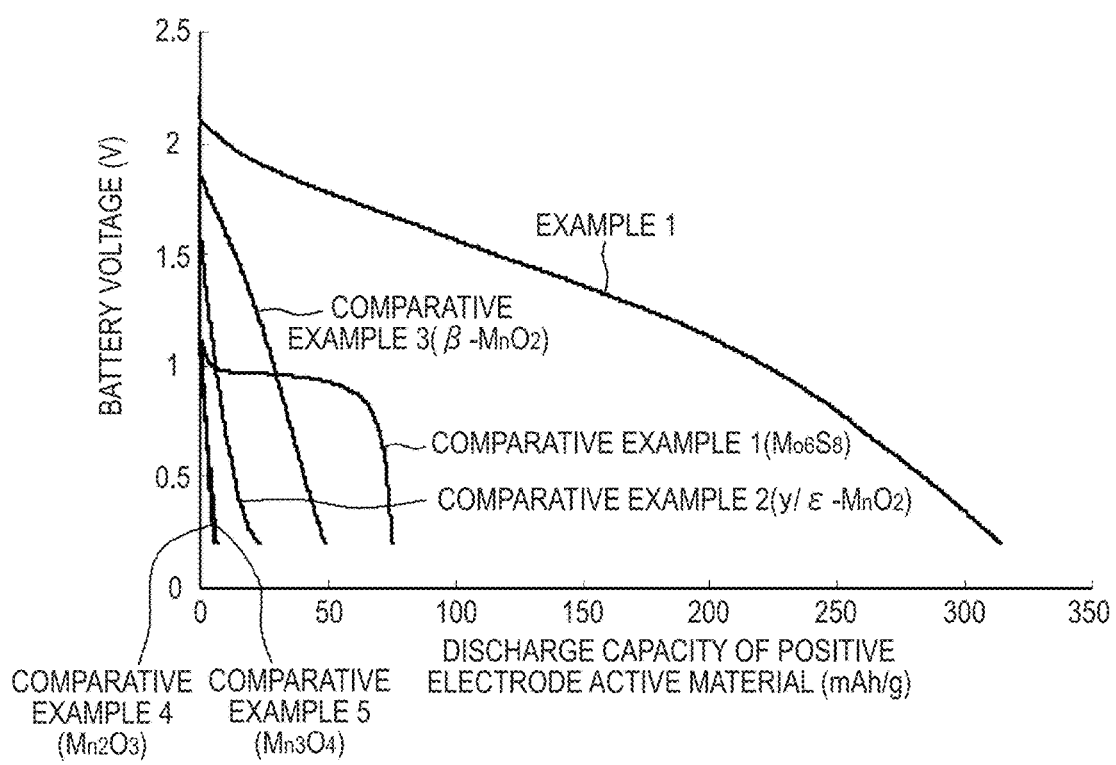
FIG. 2 shows discharge curves representing the discharge characteristics of magnesium batteries of Example 1 and Comparative Examples 1 to 5 of the invention.

FIG. 2 shows discharge curves obtained in the above discharge test, representing the discharge characteristics of the magnesium battery 10 of Example 1 and the magnesium batteries of Comparative Examples 1 to 5. Table 1 and FIG. 2 show that when used as the positive electrode active material of a magnesium battery, the manganese oxide synthesized in Example 1 exhibits a much higher discharge capacity as compared with trimolybdenum tetrasulfide and other manganese oxides employed in Comparative Examples 1 to 5.

Figure 3:
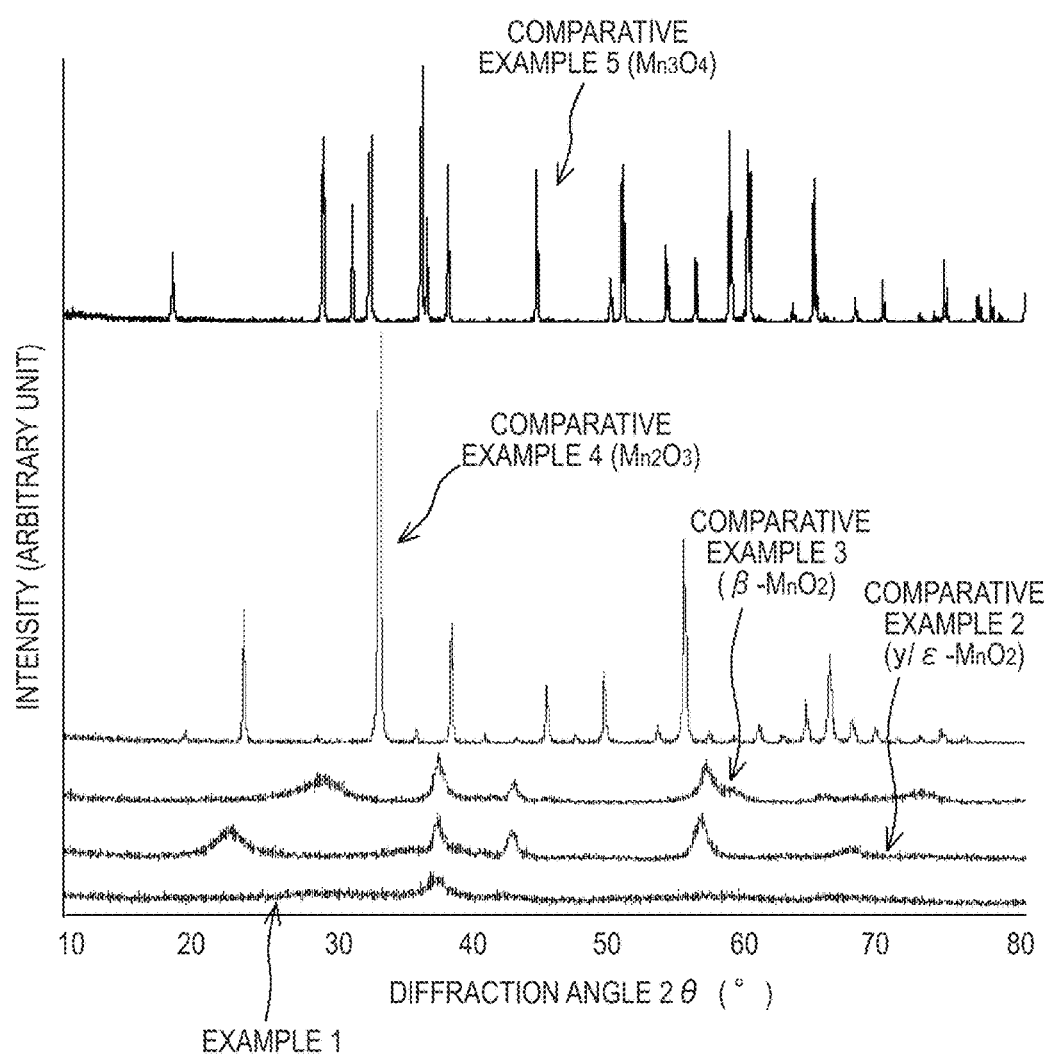
FIG. 3 shows powder X-ray diffraction patterns of a manganese oxide synthesized in Example 1 and manganese oxides used in Comparative Examples 2 to 5.

FIG. 3 shows the powder X-ray diffraction patterns of the manganese oxide synthesized in Example 1 and the manganese oxides used in Comparative Example 2 to 5. Cu-Kα was used as the X-ray source. As shown in FIG. 3, the manganese oxide synthesized in Example 1 has, as only one clear diffraction peak, a broad diffraction peak that appears at a diffraction angle 2θ of about 38° in a powder X-ray diffraction pattern. Such a powder X-ray diffraction pattern is different from any of the powder X-ray diffraction patterns of the manganese oxides used in Comparative Examples 2 to 5. Further, it does not correspond to any of the powder X-ray diffraction patterns of manganese dioxides of known crystal systems, such as α-manganese dioxide (see JP-A-7-144918 (claim 1, pp. 2 and 3, and FIG. 1) or JP-A-2003-86179 (claim 2, pp. 2-5, FIGS. 1 and 3)).

In the powder X-ray diffraction pattern of the manganese oxide synthesized in Example 1, the diffraction peak that appears at a diffraction angle 2θ of near 38° is a peak common to manganese dioxides. No other clear diffraction peak exists, and this is a characteristic of the powder X-ray diffraction pattern of the manganese oxide synthesized in Example 1. This indicates that the structure of the manganese oxide is poorly crystalline. Accordingly, the manganese oxide synthesized in Example 1 is likely to be an amorphous manganese oxide that does not belong to a specific crystal system. Supposedly, like ordinary manganese dioxides, the manganese oxide is nonstoichiometric, has manganese with an oxidation number of +3 and +4, and contains, and contains, in addition to manganese and oxygen, different kinds of cations and water in the amorphous structure thereof.

Subsequently, in Examples 2 to 4, examinations were conducted on synthesis conditions that would allow the manganese oxide according to the invention to exhibit a high discharge capacity as a positive electrode active material of for magnesium batteries.

Example 2

In Example 2, the concentration of hydrochloric acid to be reacted with potassium permanganate was varied in a range of 1.0 to 5.0 mol/l. Otherwise as in Example 1, manganese oxides according to the invention were synthesized. Magnesium batteries 10 using such manganese oxides as the positive electrode active materials were produced, and subjected to a discharge test. The obtained discharge capacity is shown in Table 2.

TABLE 2

| Battery | HCl conc. (mol/l) | Heat-treatment temperature (° C.) | Heat-treatment time (h) | Discharge capacity (mAh/g) |
|---|---|---|---|---|
| Example 2-1 | 1.0 | 300 | 2.0 | 0.5 |
| Example 2-2 | 1.5 | | | 22.1 |
| Example 2-3 | 2.0 | | | 84.7 |
| Example 2-4 | 2.5 | | | 228.3 |
| Example 2-5 | 3.0 | | | 308.3 |
| Example 2-6 | 3.5 | | | 312.5 |
| Example 1 | 4.0 | | | 314.0 |
| Example 2-7 | 4.5 | | | Not synthesized |
| Example 2-8 | 5.0 | | | Not synthesized |

Figure 4:
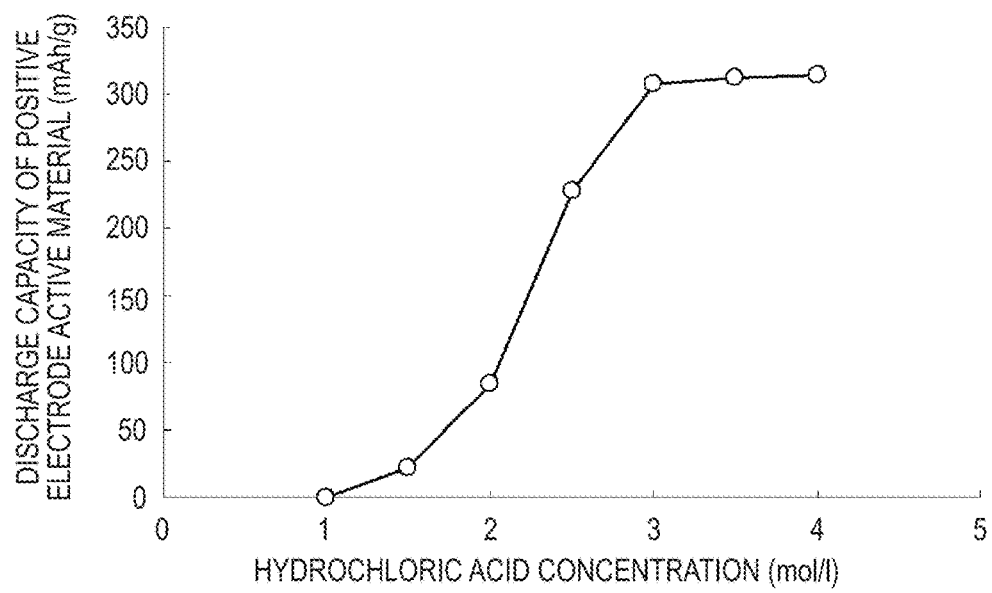
FIG. 4 is a graph showing the relation between the concentration of hydrochloric acid used in the preparation of a precipitate in Example 2 and the discharge capacity of a magnesium battery produced using the resulting manganese oxide.

FIG. 4 is a graph showing the relation between the concentration of hydrochloric acid used in the preparation of a precipitate in Example 2 and the discharge capacity of a magnesium battery produced using the resulting manganese oxide. As shown in Table 2 and FIG. 4, the manganese oxides synthesized in the Example 2 exhibit a high discharge capacity when the concentration of hydrochloric acid is 3.0 to 4.0 mol/l.

In Examples 2-8 and 2-9 where the concentration of hydrochloric acid was more than 4.0 mol/l, no precipitate was formed after the reaction of potassium permanganate with hydrochloric acid. Probably, because hydrogen chloride was present in excess in these cases, potassium permanganate reacted as in the following reaction formula, for example:

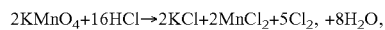

$2KMnO_4 + 16HCl \rightarrow 2KCl + 2MnCl_2 + 5Cl_2 + 8H_2O$, forming no precipitate.

Example 3

In Example 3, the temperature of heat treatment of a precipitate resulting from the reaction of potassium permanganate with hydrochloric acid was varied in a range of 100 to 550° C. Otherwise as in Example 1, manganese oxides according to the invention were synthesized. Magnesium batteries 10 using such manganese oxides as the positive electrode active materials were produced, and subjected to a discharge test. The obtained discharge capacity is shown in Table 3.

TABLE 3

| Battery | HCl conc. (mol/l) | Heat-treatment temperature (° C.) | Heat-treatment time (h) | Discharge capacity (mAh/g) |
|---|---|---|---|---|
| Example 3-1 | 4.0 | 100 | 2.0 | 154.2 |
| Example 3-2 | | 150 | | 201.6 |
| Example 3-3 | | 200 | | 242.7 |
| Example 3-4 | | 250 | | 283.5 |
| Example 1 | | 300 | | 314.0 |
| Example 3-5 | | 350 | | 310.0 |
| Example 3-6 | | 400 | | 308.9 |
| Example 3-7 | | 450 | | 50.2 |
| Example 3-8 | | 500 | | 15.0 |
| Example 3-9 | | 550 | | 8.1 |

Figure 5:
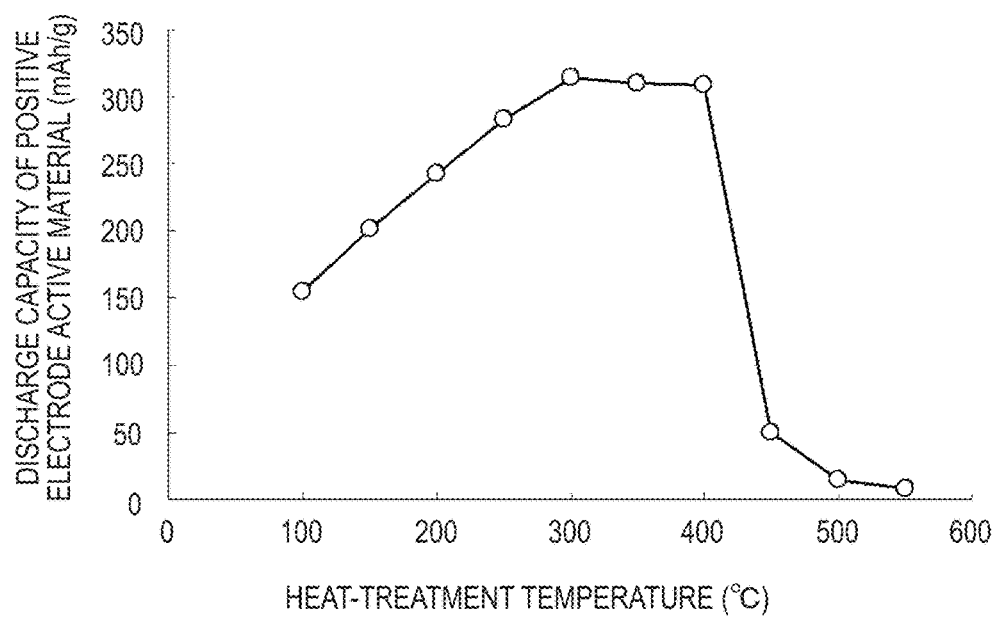
FIG. 5 is a graph showing the relation between the heat-treatment temperature employed in the heat treatment of a precipitate in Example 3 and the discharge capacity of a magnesium battery produced using the resulting manganese oxide.

FIG. 5 is a graph showing the relation between the heat-treatment temperature employed in the heat treatment of a precipitate in Example 3 and the discharge capacity of a magnesium battery 10 produced using the resulting manganese oxide. As shown in Table 3 and FIG. 5, the manganese oxides synthesized in the Example 3 exhibit a high discharge capacity when the heat-treatment temperature is 300 to 400° C.

The above-mentioned heat treatment is treatment for expelling water molecules contained in a tunnel structure, layered structure, or like space present inside a manganese oxide, so that the space can be used as an ion diffusion channel (pathway). When the heat-treatment temperature is too low, i.e., less than 300° C., water molecules are not sufficiently expelled. As a result, the ion diffusion channel (pathway) is insufficiently formed, and the manganese oxide does not sufficiently exhibit its high performance as a positive electrode active material. In addition, when the heat-treatment temperature is too high, i.e., more than 400° C., this will result in release of oxygen, structural change in the manganese oxide, etc., possibly reducing the capacity as a positive electrode active material.

Example 4

In Example 4, the time of heat treatment of a precipitate resulting from the reaction of potassium permanganate with hydrochloric acid was varied in a range of 0.5 to 10.0 hour. Otherwise as in Example 1, manganese oxides according to the invention were synthesized. Magnesium batteries 10 using such manganese oxides as the positive electrode active materials were produced, and subjected to a discharge test. The obtained discharge capacity is shown in Table 4.

TABLE 4

| Battery | HCl conc. (mol/l) | Heat-treatment temperature (° C.) | Heat-treatment time (h) | Discharge capacity (mAh/g) |
|---|---|---|---|---|
| Example 4-1 | 4.0 | 300 | 0.5 | 84.1 |
| Example 4-2 | | | 1.0 | 182.3 |
| Example 4-3 | | | 1.5 | 265.7 |
| Example 1 | | | 2.0 | 314.0 |
| Example 4-4 | | | 5.0 | 314.2 |
| Example 4-5 | | | 10.0 | 314.5 |

Figure 6:
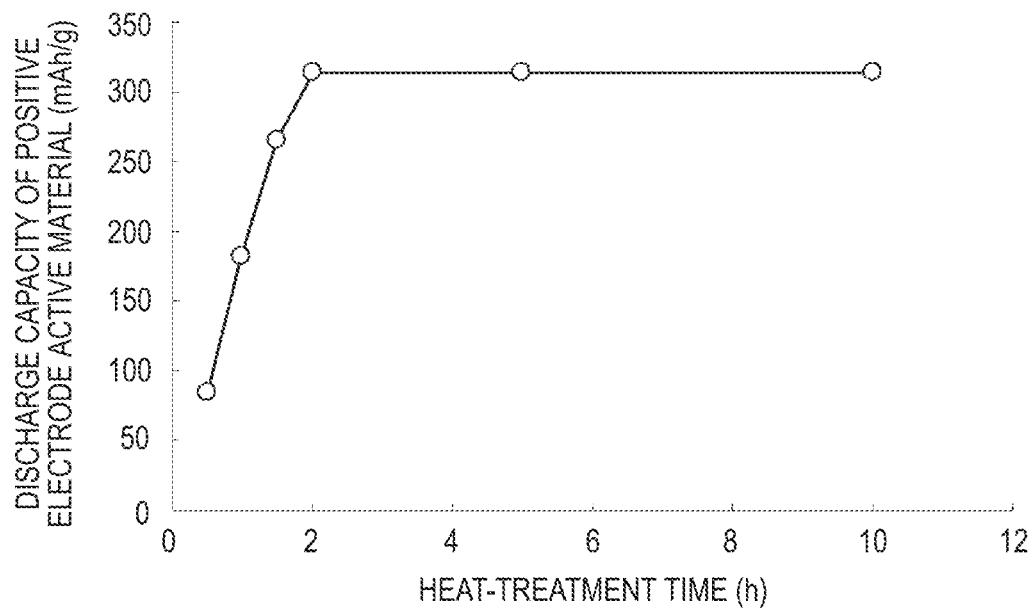
FIG. 6 is a graph showing the relation between the heat-treatment time employed in the heat treatment of a precipitate in Example 4 and the discharge capacity of a magnesium battery produced using the resulting manganese oxide.
Figure 7:
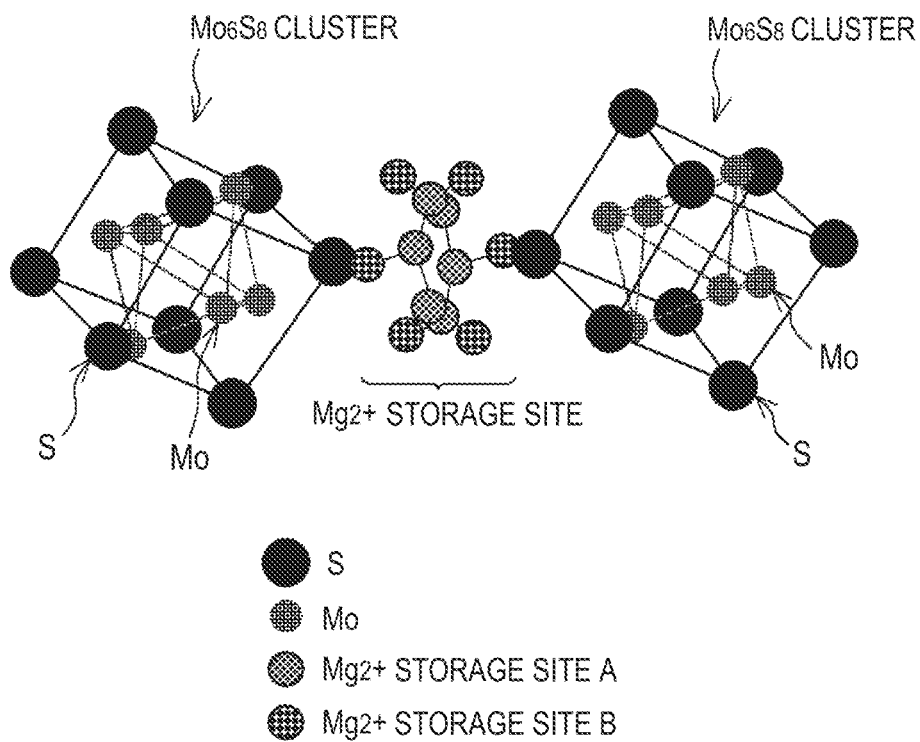
FIG. 7 is an explanatory view showing the characteristics of the structure of the Chevrel compound given in Nonpatent Document 1.

FIG. 6 is a graph showing the relation between the heat-treatment time employed in the heat treatment of a precipitate in Example 4 and the discharge capacity of a magnesium battery 10 produced using the resulting manganese oxide. As shown in Table 4 and FIG. 6, the manganese oxides synthesized in the Example 4 exhibit a high discharge capacity when the heat-treatment time is not less than 2.0 hours. This will lead to a conclusion that when the heat-treatment time is too short, i.e., less than 2 hours, water molecules are not sufficiently expelled. As a result, the ion diffusion channel (pathway) is insufficiently formed, and the manganese oxide does not sufficiently exhibit its high performance as a positive electrode active material.

Accordingly, manganese oxides suitable as positive electrode active materials for the magnesium battery 10 are preferably synthesized under the conditions that hydrochloric acid to be reacted with a permanganate has a concentration of 3 to 4 mol/l; heat treatment of the resulting precipitate is conducted at a temperature of 300 to 400° C.; and the heat treatment is conducted for a period of not less than 2 hours.

In addition, when the cases of using sodium permanganate and magnesium permanganate as permanganates were examined, the same results as in the case of using potassium permanganate were obtained. Thus, according to the invention, a nonaqueous electrolyte magnesium battery having a high capacity together with excellent safety and productivity can be provided.

The invention was explained with reference to the embodiment and examples above, but various modifications can be made thereto on the basis of the technical idea of the invention.

For example, with respect to the electrochemical device according to the invention suitable for use as a primary or secondary battery, its shape, structure, material, and the like can be suitably selected without deviating from the invention.

In addition, although an example using magnesium ions as the metal ions was explained above, aluminum ions and lithium ions can also be used.

INDUSTRIAL APPLICABILITY

The electrochemical device of the invention provides, for example, a magnesium secondary battery capable of sufficiently exploiting the excellent characteristics of magnesium metal or the like as a negative electrode active material, such as high energy capacity. The invention thus contributes to reducing the size and weight of small electronic devices, and also imparting portability thereto. The invention also contributes to improving the convenience and reducing the price.

The invention claimed is:

1. An electrochemical device comprising:
a first electrode comprising a manganese oxide obtained by filtering a precipitate resulting from a reaction of a permanganate with hydrochloric acid and subjecting the precipitate to heat treatment, and wherein the manganese oxide has, as only one diffraction peak, a broad diffraction peak that appears at a diffraction angle 2θ of about 38° in a powder X-ray diffraction pattern; and
a second electrode.

2. The electrochemical device according to claim 1, wherein the precipitate, after filtration is washed with water before being subjected to the heat treatment, thereby resulting in the manganese oxide.

3. The electrochemical device according to claim 1, wherein the permanganate is at least one kind of permanganate selected from the group consisting of sodium permanganate, potassium permanganate, and magnesium permanganate.

4. The electrochemical device according to claim 1, wherein the hydrochloric acid has a concentration of 3 to 4 mol/l.

5. The electrochemical device according to claim 1, wherein the heat treatment is conducted at a temperature of 300 to 400° C.

6. The electrochemical device according to claim 1, wherein the heat treatment is conducted for a period of not less than 2 hours.

7. The electrochemical device according to claim 1, wherein the second electrode comprises magnesium, aluminum or lithium as an elemental metal, or is an alloy containing magnesium, aluminum, and/or lithium.

8. The electrochemical device according to claim 1, wherein the second electrode comprises an active material that is oxidized to form metal ions, the metal ions being magnesium ions, aluminum ions or lithium ions.

9. The electrochemical device according to claim 1, wherein the manganese oxide comprises an amorphous manganese oxide.

10. The electrochemical device according to claim 1, wherein the manganese oxide has octahedral constitutional units that form an ion diffusion channel, each octahedral constitutional unit having six oxygen atoms coordinated around a manganese atom.

11. The electrochemical device according to claim 1, wherein the magnesium oxide is retained as a first electrode active material with a conductive material and/or a polymer binder.

12. The electrochemical device according to claim 11, wherein the conductive material comprises graphite powder and/or carbon particulates.

13. The electrochemical device according to claim 11, wherein the polymer binder comprises polyvinylidene fluoride.

14. The electrochemical device according to claim 1, further comprising a separator containing an electrolyte.

15. The electrochemical device according to claim 1, wherein the electrochemical device is configured as a rechargeable battery.

16. An electronic device comprising the electrochemical device according to claim 1.

17. A method for producing an electrochemical device having a first electrode and a second electrode comprising:
obtaining a manganese oxide for the first electrode by filtering a precipitate resulting from a reaction of a permanganate with hydrochloric acid and subjecting the precipitate to heat treatment, and wherein the manganese oxide has, as only one diffraction peak, a broad diffraction peak that appears at a diffraction angle 2θ of about 38° in a powder X-ray diffraction pattern.

* * * * *